A. P. EVES.
CORD FOR TIRES.
APPLICATION FILED FEB. 1, 1917.
1,369,273.  Patented Feb. 22, 1921.
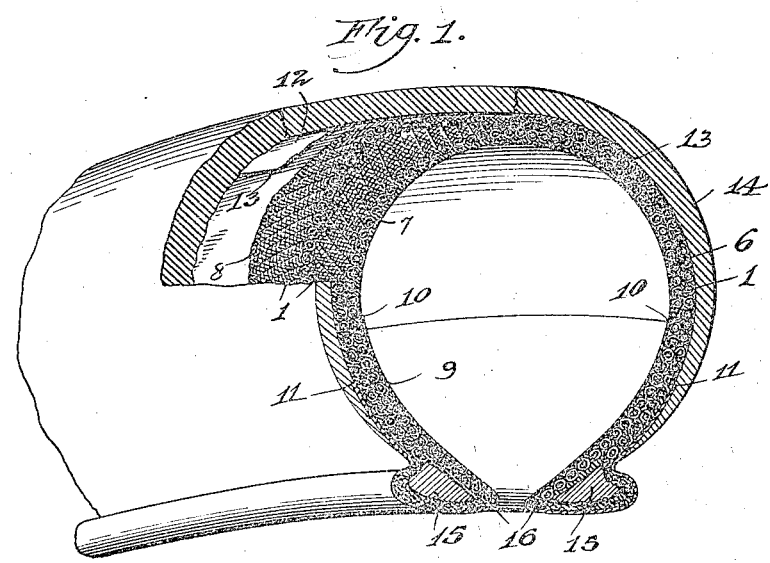
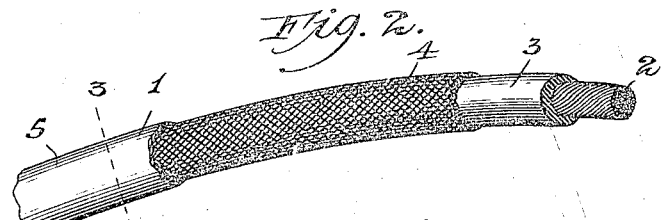
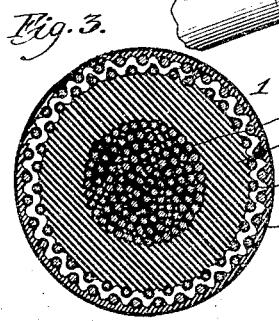
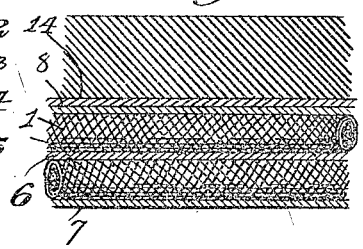
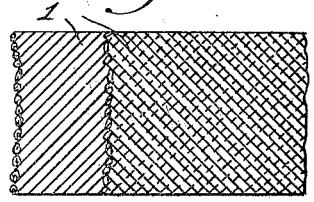
Witness,
J. S. Mann
Inventor.
Archibald P. Eves
By Frank L. Belknap
Atty

UNITED STATES PATENT OFFICE.

ARCHIEBALD P. EVES, OF CHICAGO, ILLINOIS.

CORD FOR TIRES.

1,369,273.     Specification of Letters Patent.     Patented Feb. 22, 1921.

Application filed February 1, 1917. Serial No. 145,861.

*To all whom it may concern:*

Be it known that I, ARCHIEBALD P. EVES, a citizen of the United States, and a resident of the city of Chicago, in the county of Cook and State of Illinois, have invented certain new and useful Improvements in Cords for Tires, of which the following is a specification.

This invention relates to improvements in tires and refers more particularly to that kind of tire in which the outer casing or sheathing is built up of rubber composition and fabric cords.

Among the salient objects of the invention are to provide a construction which can be readily and economically made and which combines maximum strength with a maximum resiliency; to provide a construction of the character referred to in which the casing is composed of a plurality of fabric sheaths, each sheath being formed of flexible cords and each cord comprising an inner fabric core inclosed in a rubber or outer elastic jacket, an outer fabric covering surrounding the jacket and a rubber or other elastic outer jacket around the fabric covering; to provide a construction of the character last referred to in which the threads of the core and fabric covering are preferably coated or impregnated with a rubber composition or other hydrocarbon solution in order to further increase the resiliency and life of the fabric threads; to provide a construction in which the fabric sheaths are so arranged as to obtain maximum strength and are nevertheless adequately protected against deterioration by moisture or the like and in which the rubber is so arranged as to obtain the maximum resiliency; to provide a construction of the character referred to in which the fabric and hydrocarbon compositions are, after being properly assembled relative to each other, vulcanized into a unitary structure and in general to provide an improved construction of the character referred to.

In the drawings:

Figure 1 is a fragmentary, perspective view, parts being broken away and shown in section of an automoblie tire equipped with my invention.

Fig. 2 is a similar view on an enlarged scale of one of the cords used in the outer sheath or casing.

Fig. 3 is a view on a still larger scale taken on lines 3—3 of Fig. 2.

Fig. 4 is a section of the tire laid out flat.

Fig. 5 is a sectional view showing the manner in which the cords are angularly arranged relative to each other.

I am aware that heretofore cord tires have been made and patented but as far as I know none of them have embodied the construction hereinafter particularly described and set forth in the appended claim.

Referring to the drawings, 1 designates as a whole one of the cords. This cord comprises an inner core 2 formed of a plurality of yarns or threads twisted together as shown in the drawing. This core may if desired be made of cotton threads. Preferably the threads of the core are saturated or impregnated with a hydrocarbon composition such as a bituminous composition or a rubber composition, or a mixture of both. Each core 2 is incased in an elastic or resilient jacket 3, which is preferably of a hydrocarbon nature, such as a rubber or bituminous composition or a mixture of both. Around the jacket is a woven fabric sheathing 4 which is preferably of cloth but might in certain instances be made of a very fine mesh wire. This is preferably saturated with a hydrocarbon composition, such as a rubber or bituminous composition or a mixture of both. Around the sheathing 4 is an outer resilient jacket 5 preferably of a hydrocarbon nature such as a rubber composition, bituminous or both. A cord constructed as above described gives a maximum resiliency combined with maximum strength and at the same time is relatively economical in manufacture. Another advantage in the cord made as above described over that now used is that it can be more readily constructed into tire form because of its added flexibility over that of the cords now in use. It will be noted with reference to Fig. 3 that the inner resilient jacket 3 is preferably thicker than the outer jacket 5, the latter being in effect a skin coat whereby the cords can be more readily cemented to each other in building up the tire than would be the case were it not used.

Describing now the manner in which the cords after being made are wound around a suitable core in two layers, the cords of one layer being alternately disposed relative to the cords of the other, as shown clearly in the drawings. Between each layer of cords is interposed a ply of rubber or other hydrocarbon compound 6, which extends entirely around the casing. At the inner side of the cores is a second ply of rubber 7, which also extends entirely around the sheath. At the outer sides of the cords is a third ply of rubber or other hydrocarbon composition, which also extends entirely around the casing. Around the lower ends of the casing is a chafing strip 9, which extends from the points 10 at the inner side of the sheathing and around the bead and up to the points 11. At the top of the casing and just above the rubber ply 8 is a breaker strip 12, which extends between the points 13. Inclosing the parts above described is the rubber tread 14, which tapers in thickness toward the bead 15. The two layers of cords extend around the bead 15 and meet at the end of the bead as shown at 16.

The parts above described after having been formed in position are vulcanized into a unitary structure in the usual way. From the foregoing it will be seen that I attain the objects of the invention and have formed an outer casing which will stand the severe strain to which the casings of motor-cars and the like are subjected. The invention is not limited to the details of construction shown except as set forth in the appended claim.

I claim as my invention:

A cord, adaptable for use in building up a cord tire casing, comprising a core portion made of a plurality of fabric-like threads saturated with hydrocarbon solution, a resilient jacket or rubberized hydrocarbon substance inclosing the core portion, a hydrocarbon saturated sheath portion, and an outer resilient jacket substantially thinner than the inner jacket, forming a texture more readily united with layers.

ARCHIEBALD P. EVES.